United States Patent [19]

Schlueter et al.

[11] Patent Number: 4,630,431
[45] Date of Patent: Dec. 23, 1986

[54] COMBINATION PLATFORM AND SHIELD FOR AN IMPLEMENT

[75] Inventors: Francis E. Schlueter, Des Moines; Joel M. Schreiner, Ankeny, both of Iowa

[73] Assignee: Deere & Company, Moline, Ill.

[21] Appl. No.: 793,605

[22] Filed: Oct. 31, 1985

[51] Int. Cl.[4] .................. A01D 46/08; B62J 13/06
[52] U.S. Cl. .................... 56/28; 56/14.6; 56/DIG. 24; 474/146; 74/608; 182/91
[58] Field of Search .......... 56/28, 14.6, 191, DIG. 24; 74/608; 474/146; 248/235; 182/91; 280/166

[56] References Cited

U.S. PATENT DOCUMENTS

| | | | |
|---|---|---|---|
| 1,556,983 | 10/1925 | Weintraub et al. | 474/146 |
| 1,953,298 | 4/1934 | Goodwin | 182/91 |
| 4,057,125 | 11/1977 | Kroft | 280/166 |
| 4,140,327 | 2/1979 | Hackney | 280/166 |
| 4,159,122 | 6/1979 | Stevens | 182/91 |

Primary Examiner—Robert Peshock
Assistant Examiner—John G. Weiss

[57] ABSTRACT

The innermost end of a platform is pivotally connected to an implement adjacent upright sidewall structure which supports moving parts that normally are shielded but from time to time require inspection and service. The platform is rockable between a horizontal access position and a vertical shielding position. A door or shield is connected to the outer end of the platform, and four-bar linkage structure maintains the door in an upright position to provide a railed work station for the operator when the platform is in the horizontal position and a generally continuous upright shield structure when the platform is in the vertical position. The four-bar linkage structure includes upper and lower links which contact each other when the platform is horizontal to support the platform without need for obstructive braces or the like.

21 Claims, 5 Drawing Figures

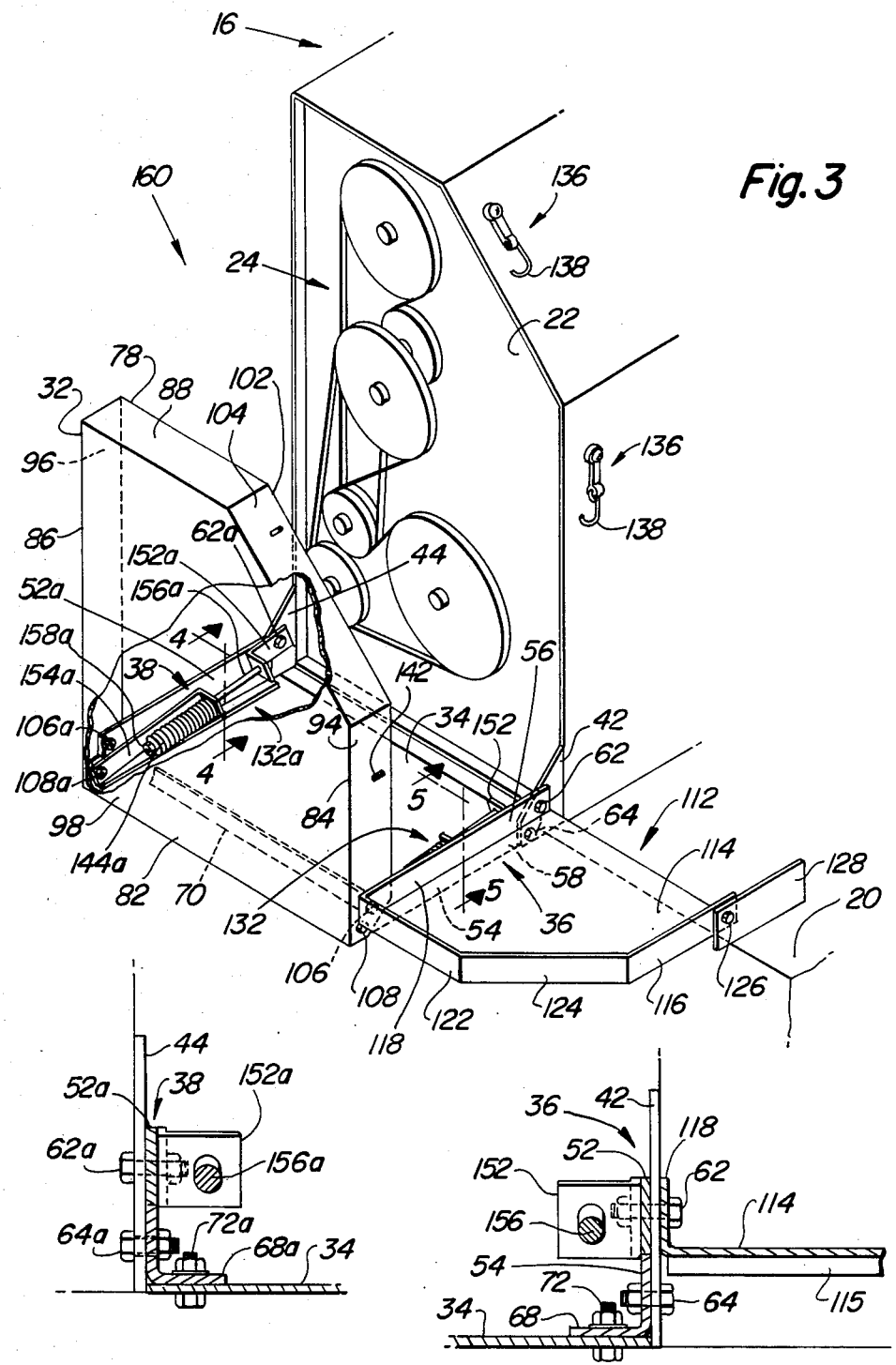

COMBINATION PLATFORM AND SHIELD FOR AN IMPLEMENT

BACKGROUND OF THE INVENTION

The present invention relates generally to shields for agricultural equipment such as combines and cotton harvesters, and more specifically to a movable shield structure for providing access to areas which must be periodically inspected and serviced.

Most agricultural implements including combines and cotton harvesters have moving parts such as pulleys and sprockets located near the side or the end of the implement frame. These and other types of moving parts are often shielded during operation. To access these parts for service and inspection, shields must be opened or removed. These shields are commonly in the form of doors or panels, or bolt-on covers which must be physically removed from the machine. Removal and handling of the shield often is less convenient than desirable, particularly when the shield is located at an out-of-the-way position. Service and inspection requirements may also dictate the use of ladders or platforms to provide access, particularly when they are located well above ground level or at some other location not easily accessible by the operator. Typically, fixed platforms are utilized which often create an obstruction to one side of the machine or restrict visibility during machine operation. When the platform is located near the side of the machine, additional handrails are required for the operator. These handrails also create another fixed obstruction which can limit access to the machine or restrict visibility during machine operation.

OBJECTS OF THE INVENTION

It is therefore an object of the present invention to provide improved shield structure for an implement such as a combine or cotton harvester.

It is another object of the invention to provide an improved shield structure which eliminates the need for a fixed platform adjacent the location of the shielded parts. It is yet another object to provide such a structure which eliminates the need for fixed handrails which protrude outwardly from the machine while the machine is in the field operating mode.

It is a further object of the invention to provide movable shield structure with platform structure having a closed, shielding position wherein the platform fits closely adjacent the machine without obstructing access to the machine or restricting operator visibility on the machine during machine operation. It is a further object to provide such a structure having an open position wherein the shield structure forms part of the platform structure for the operator to have access to the previously shielded parts.

It is yet another object of the invention to provide an improved shield structure which eliminates the need to remove large panels or covers and eliminates hard to operate doors or other structure for providing access to parts on a machine.

It is yet another object of the present invention to provide an improved shield structure having a door and a platform attached to linkage structure which when in a closed position provides a vertical shield for parts on the machine and which in the open position exposes the shielded area and moves the platform to a horizontal position for providing easy operator access to the parts for service and inspection. It is still another object to provide such a structure with a linkage which supports the structure in both the open and closed positions and which obviates obtrusive diagonal rods or cables or similar supporting elements when the platform is in the horizontal position.

BRIEF DESCRIPTION OF THE INVENTION

The platform and shield structure constructed in accordance with the teachings of the present invention includes a door or upright shield and a platform attached to four-bar linkage structure adjacent the parts to be shielded on an implement. When the linkage is in the closed or up position, the door and platform provide a vertical shield covering the parts. Opening the mechanism exposes the normally shielded area and moves the platform to a horizontal position. In this configuration, that is, the open configuration, the linkage provides support for the platform and maintains the door in an upright position to act as a railing or the like for the operator. The linkage rocks about offset pivots so that the links contact in the open and closed positions to provide platform support and self-locking. The folding platform does not create a fixed obstruction or restrict visibility during machine operation since both the door and platform are located closely adjacent the side of the machine over the area to be shielded. When service or inspection of the parts is necessary, the mechanism is opened to provide a horizontal support structure, located between the parts and the door, for the operator to stand on while at the same time exposing the parts for access without physical removal or other handling of a shielding cover or other similar structure. Handrails are built into the door to eliminate fixed handrails that would otherwise provide a restricted visibility area or obstruction near the side of the machine.

These and other objects, features and advantages of the present invention will become apparent to one skilled in the art upon reading the following detailed description when taken with the drawings.

BRIEF DESCRIPTION OF THE DRAWINGS

FIG. 3 is an enlarged side perspective view of the platform and shield structure of FIG. 1 with the structure shown in the open position.

FIG. 4 is a view taken along lines 4—4 of FIG. 3.

FIG. 5 is a view taken along lines 5—5 of FIG. 3.

DESCRIPTON OF THE PREFERRED EMBODIMENT

Figure 1:
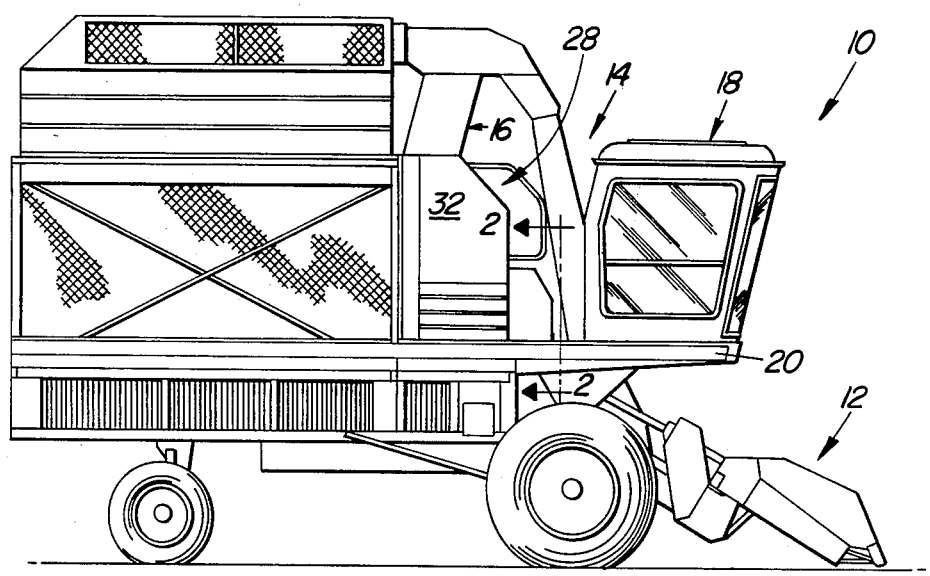
FIG. 1 is a side view of a cotton harvester including the platform and shield structure of the present invention in the closed or shielding position.

Referring now to FIG. 1, therein is shown generally at 10 an agricultural machine. The machine 10 is shown as a cotton stripper having forwardly directed row harvesting units 12 with cotton conveying structure 14 for moving cotton from the units 12 to a cotton cleaner 16 located rearwardly of an operator cab 18 on frame 20. The cotton cleaner 16 extends outwardly toward one side of the machine 10 and includes upright sidewall or support structure 22 (FIG. 3) supporting a plurality of belt-driven pulleys 24 or other moving parts such as sprockets or shafts, which from time to time require inspection and/or servicing. Movable shield and platform structure 28 is connected to the implement frame 20 for movement between a closed or shielding position (FIG. 1 and solid lines of FIG. 2) for covering the moving parts 24 during the field working operation, and an open or access position (broken lines of FIGS. 2, and FIG. 3) wherein the moving parts 24 are exposed for easy access. In the open position, the structure provides a railed platform on which the operator may stand during servicing and inspection of the formerly shielded area. Although the structure 28 is shown in combination with a cotton cleaner 16 on a cotton harvester 10, it is to be understood that the structure 28 may be also used on other machines having moving parts such as pulleys and sprockets which are shielded during machine operation but which must be accessed for service and inspection from time to time.

The movable shield and platform structure 28 includes an upright door or shield 32 pivotally connected at its lower end to the upper end of a platform 34. The platform 34 is pivotally connected at its lower end to the implement frame 20 for rocking between an upright position adjacent the sidewall structure 22 (FIG. 1 and solid lines of FIG. 2) and a horizontal position (FIG. 3) projecting outwardly from the sidewall. Front and rear four-bar linkage structures 36, 38 are connected at their inward or lowermost ends to bracket structure 42, 44, respectively, and at their outer ends to the lower portion of the door 32. The four-bar linkage structure 36, 38 maintains the door 32 in a generally vertical position as the platform is rocked between its upright and horizontal positions. As will be described in detail later, the elements of the four-bar linkage structure 36, 38 are arranged with offset pivot points so that the links contact both in the upright position (solid lines of FIG. 2) and in the horizontal position (broken lines of FIG. 2). The structure 28 is self-locking in the open and closed positions and is self-supporting in the open position, so that additional platform supports such as cables or links are not necessary.

Figure 2:
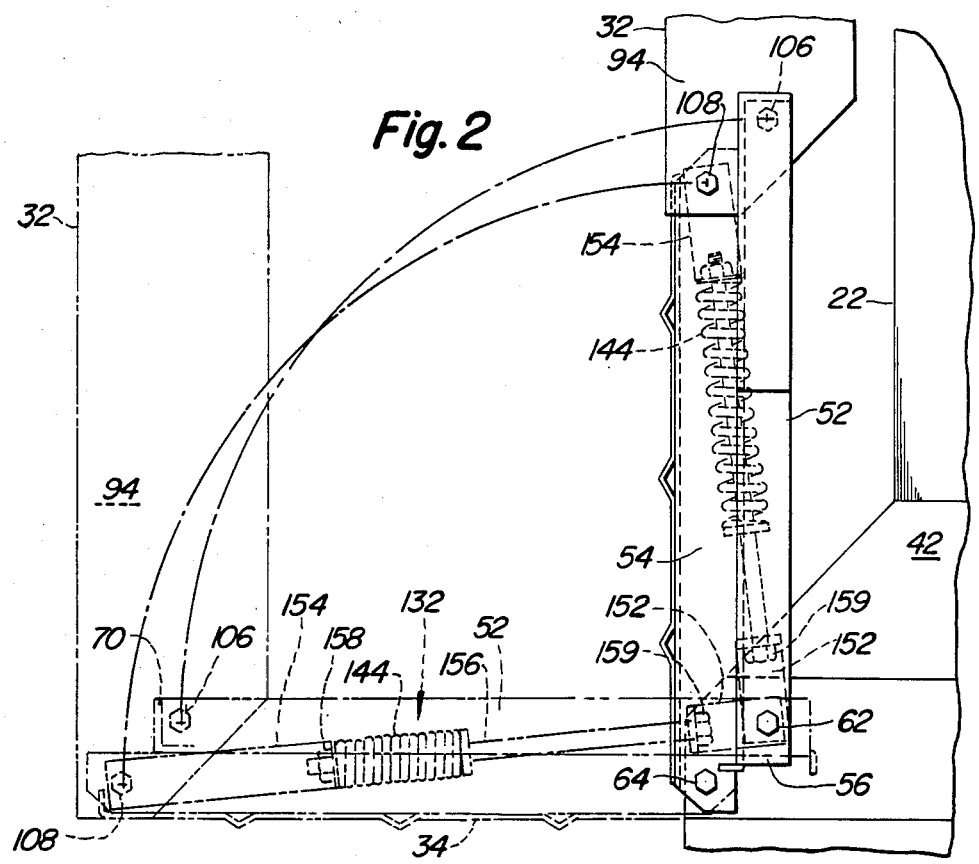
FIG. 2 is an enlarged view, taken generally along lines 2—2 of FIG. 1, of a portion of the platform and shield structure showing the structure in the closed position (solid lines), and in the open position (broken lines).

The bracket structures 42 and 44 include upright plates fixed at their innermost ends to the cleaner 16 and at their lower ends to the implement frame 20. The four-bar linkage structures 36 and 38 are generally mirror images of each other, and therefore only the forward four-bar linkage structure 36 will be described in detail here. The linkage structure 36 includes an upper link 52 and a closely adjacent lower link 54. The links 52 and 54 are approximately equal in length and include innermost ends 56 and 58, respectively, which are apertured to receive pivot pins 62 and 64 extending through corresponding apertures in the bracket 42. The pins 62 and 64 lie generally along a line extending forty-five degrees from the horizontal with the upper pivot pin 62 lying more closely adjacent the upright sidewall structure 22 than the lower pin 64. The upper link 52 is generally in the form of a flat strap, while the lower link 54 is in the form of an angle having a lower, inwardly turned flange 68 (FIGS. 2 and 5). The vertical side of the lower link 54 lies directly below and contacts the upper link 52 when the links 52 and 54 are either in the horizontal (FIG. 3) or vertical (FIG. 2—solid lines) positions. The construction of the four-bar linkage structure 38 of FIG. 4 is similar to that described for FIG. 5 and corresponding elements are labeled utilizing the same numbers with a subscript a. In the preferred embodiment, the upper links 52, 52a are connected at their outermost ends by a bight portion 70 to form a U-shaped structure for added strength.

The floor 34 includes a rectangular ribbed panel connected by bolts 72 and 72a to the flanges 68 and 68a of the lower links 54 and 54a. The platform 34 constrains the four-bar linkages 36 and 38 for pivoting in unison about the respective pivot points 62 and 64 and 62a, 64a. When the four-bar linkage structure 36, 38 and the attached platform 34 are in horizontal position, the upper and lower links 52, 54 and 52a, 54a contact each other to provide a sturdy support for the platform 34.

The door or shield 32 includes an upper portion 78, a lower portion 82, a front portion 84 and a rear portion 86. Inwardly extending walls 88, 94 and 96 extend inwardly at right angles to a generally flat panel 98 from the respective portions at 78, 84 and 96. An upper forward portion 102 with an inwardly extending wall 104 is angled diagonally from the portion 78 to the portion 84 to conform generally to the shape of the upper portion of the upright sidewall structure 22. The door 32 therefore opens generally inwardly toward the moving parts 24 so that when the movable shield and platform structure 28 is in the closed position, the door 32 shields the moving parts 24.

The lower portion of the door 32 is connected to the links 52, 54 and 52a, 54a by pivot pins 106, 108 and 106a, 108a, respectively. The pins pass through the distal ends of the respective links and through the lower portions of the walls 94 and 96, respectively, with the lower pivot pins 108, 108a extending outwardly beyond the upper pivot pins 106, 106a in substantially the same manner as the upper pins 62, 62a extend inwardly beyond the lower pivot pins 64 and 64a of the innermost pivotal connections of the four-bar linkage structure 36 and 38. The parallel four-bar linkage structure 36 and 38 therefore maintain the door or shield 32 in an upright position as the movable shield and platform structure 28 is swung between the open or access position of FIG. 3 and the closed shielding position of FIG. 1 and FIG. 2 (solid lines). The platform 34 acts to shield the lower portion of the upright sidewall structure 22 when the structure 28 is in the closed or shielding position of FIGS. 1 and 2.

To provide easier access to the forward portion of the movable shield and platform structure 28 when in the access position, an additional platform structure 112 is connected for rocking with the upper link 52 of the four-bar linkage structure 36. The platform structure 112 includes a lower panel 114 with an inner downturned flange 115 and front and rear upright flanges 116, 118, respectively, extending upwardly from the lower panel 114. An outer flange 122 extends upwardly from the panel 114 and is connected to the flange 118 extending rearwardly therefrom to a connection with a diagonal flange 124 which extends to the front upright flange 116. The innermost portion of the rear flange 118 is pivotally connected to the bracket structure 42 by the pivot pin 62, and the inwardmost portion of the front upright flange 116 is pivotally connected for rocking about an axis generally corresponding to the axis of pivot pins 62 by a pivot pin 126 extending through an aperture and a bracket 128 which in turn is fixed to the implement frame 20. The outermost end of the rear upright flange 118 is connected by the pivot pin 106 outwardly adjacent the wall 94 of the door 32. In the preferred embodiment, the links 52 and 54 of the four-bar linkage structure 36 are located inside of (that is, to the left of as viewed in FIG. 3) the wall 94 and the bracket structure 42, and the flange 118 is supported on the opposite side of the wall 94 and bracket structure 42. The lower panel 114 of the platform structure 112 remains parallel to the platform 34.

To counter some of the effects of gravity as the movable shield and platform structure 28 is rocked between open and closed positions, biasing structure, indicated generally at 132 and 132a of FIGS. 3-5, is connected inwardly adjacent the four-bar linkage structure 36 and 38, respectively. The biasing structure 132, 132a biases the shield and platform structure 28 toward the closed position of FIG. 1 to reduce the force necessary to move the structure 28 upwardly toward the closed position. The structure 132, 132a also helps to maintain the structure 28 in the closed position. However, two latches 136 are provided on the cleaner 16, each with a hooked end 138 adapted for insertion into a notch 142 on the corresponding walls 94 or 104 of the door 32, to secure the structure 28 in the closed position.

The biasing structure 132, 132a includes springs 144, 144a acting to bias the pivot points 62, 108 and 62a, 108a, respectively, towards each other. In order to provide a compact, effective arrangement inwardly adjacent the four-bar linkage structures 36 and 38, compression springs are utilized. Since the structures 132, 132a are generally identical, only the structure 132a will be described in detail here. First and second angle brackets 152a, 154a are pivotally connected to the four-bar linkage structure 38 by the pins 62a, 108a, respectively. A threaded rod 156a is inserted through the compression spring 144a and through the apertured angled ends of the angle brackets 152, 154. The outermost end of the spring 144a abuts against a nut 158a threaded onto the end of the rod 156a, and a headed end 159a of the rod 156a bears against the angle apertured end of the bracket 152a. The nut 158a is tightened onto the threaded end of the rod 156ato provide a preselected compression of the spring 144a which acts to urge the angle brackets 152a, 154a towards each other.

For added operator convenience, a handrail 160 is connected between the upper portion of the wall 104 and the lower portion of the wall 94. In operation, the movable shield and platform structure 28 is normally in the upright or closed position as shown in FIG. 1 with the door 32 substantially covering the upper portion of the moving parts 24 and with the platform 34 and linkage structures 36 and 38 shielding the lower portion of the sidewall structure 22. If the operator wishes to inspect the moving parts 24, he unlatches the hooked ends 138 of the latches 136 from the corresponding slots 142 of the door 32. He then urges the door 32 outwardly away from the sidewall structure 22 causing the four-bar linkage structure 36 and 38 to pivot downwardly about the pivot pins 62, 64 and 62a, 64a. As the door 32 moves away from the structure 22, the four-bar linkage structures 36 and 38 maintain the door 32 in an upright position. As the pivot pins 108, 108a and 62, 62a move further apart with the lowering of the platform 34 to the horizontal position, the springs 144, 144a further compress to help balance the increased force of gravity on the structure 28 as it moves outwardly and downwardly from the sidewall structure 22. The nuts 158, 158a are adjusted to assure that the springs 144, 144a provide sufficient biasing while still permitting the structure 28 to remain in the fully unfolded or open position of FIG. 3 under its own weight. The additional platform structure 112 moves with the platform 34 from the upright position of FIG. 1, wherein it along with the handrail 160 generally closes the right-hand portion (as view in the forward direction of travel in FIG. 1) of the harvester portion between the cleaner 16 and the rear of the cab 18, to a horizontal position (FIG. 3) wherein the operator has convenient access from the harvester to the platform 34. In the open position of FIG. 3, the door 32 acts as a rail for the operator, and a convenient operator station designated generally at 160 is thereby provided between the door 32 and the wall structure 22 above the platform 34. After the parts 24 are inspected and serviced, the movable shield and platform structure 28 is raised to the closed or shielding position of FIG. 1, and the hooked ends 138 of the latches 136 are inserted into the corresponding slots 142 of the door 32 to maintain the structure in the shielding position.

Having described the preferred embodiment, it will be apparent that modifications can be made without departing from the scope of the invention as defined in the accompanying claims.

We claim:

1. In an implement having upright structure supporting operable elements during operation, movable shield structure comprising:
    linkage structure rockably connected to the implement adjacent the lower portion of the upright supporting structure and movable between an upright position and an outwardly extending position;
    an upright shield having upper and lower ends; and
    means connecting the lower end of the shield to the linkage structure for rocking therewith between a shielding position adjacent the operable elements and an access position offset from the elements as the linkage structure moves between the upright and outwardly extending positions, respectively, wherein said linkage structure includes means for maintaining the shield upright in both the shielding and access positions.

2. The invention as set forth in claim 1 including means operably associated with the linkage structure for defining a horizontal platform adjacent the lower end of the shield when the latter is in the access position.

3. The invention as set forth in claim 2 wherein the platform is movable to an upright position with the linkage structure.

4. The invention as set forth in claim 1 wherein the linkage structure comprises four-bar linkage structure including parallel links movable between first and second contacting positions corresponding to upright and outwardly extending positions of the linkage structure for supporting the shield in either of the shielding and access positions.

5. The invention as set forth in claim 4 further including a spring connected between the parallel links and biasing the linkage structure toward the upright position.

6. In an implement having a frame and upright structure supporting operable elements, movable shield and platform structure, comprising:
    a platform having a first end and a distal end;
    means pivotally connecting the first end of the platform to the implement frame adjacent the upright structure for rocking between an upright position adjacent the operable elements and a horizontal position wherein the distal end extends outwardly from the upright structure;
    an upright element shield having a lower end pivotally connected to the distal end of the platform; and means supporting the upright shield in the upright position when the platform is in the horizontal position to provide an operator workstation between the shield and the upright structure.

7. The invention as set forth in claim 6 including linkage means for maintaining the shield in an upright position as platform is rocked between the upright and horizontal positions.

8. The invention as set forth in claim 7 wherein the linkage means includes four-bar linkage structure having parallel links movable to contacting positions as the platform is moved to the horizontal position to provide vertical support for the platform.

9. The invention as set forth in claim 8 wherein the linkage means includes upper and lower links and the means pivotally connecting includes upper and lower pivot means for connecting corresponding ends of the links to the implement with the upper link pivot means offset inwardly toward the upright structure with respect to the lower link pivot means.

10. The invention as set forth in claim 9 including means for pivotally connecting the opposite ends of the links to the upright shield and wherein the upper and lower links are of equal length.

11. The invention as set forth in claim 6 wherein the upright element shield is generally shaped to conform to the shape of the element-supporting structure and includes sidewalls projecting towards the element-supporting structure.

12. The invention as set forth in claim 6 wherein, when the platform is in the upright position, the platform and shield define a generally continuous upright shielding structure extending between the first end of the platform and the top of the element shield.

13. The invention as set forth in claim 9 including rod means having a first end connected to one of the links, angle bracket means connected to the other of the links and receiving the second end of the rod means therethrough, and a spring compressed between the second end and the angle bracket means for biasing the platform toward the upright position.

14. The invention as set forth in claim 6 including a second platform connected for rocking with the first platform.

15. The invention as set forth in claim 6 wherein the upright shield defines an operator handrail when the platform is in the horizontal position.

16. In an implement having a frame and including upright structure supporting operable elements, movable shield and platform structure comprising:
a platform having an inner end and a distal end;
first means connecting the inner end of the platform to the implement frame for rocking between an upright position adjacent the elements and a horizontal position extending outwardly from the upright structure;
an upright shield having upper and lower ends;
second means connecting the lower end of the shield adjacent the distal end of the platform for rocking therewith between the upright and horizontal positions; and
means for maintaining the shield in the upright position when the platform is in either the upright or the horizontal position whereby the platform and shield define a generally continuous upright shielding structure extending from the first means connecting to the upper end of the shield when the platform is in the upright position, and a railed platform structure extending between the distal end and the upright element supporting structure when the platform is in the horizontal position.

17. The invention as set forth in claim 16 wherein the means for maintaining the shield in the upright position comprises four-bar linkage structure connected to the platform and the shield.

18. The invention as set forth in claim 17 wherein the shield and four-bar linkage structure are self-supporting when the platform is in the horizontal position.

19. The invention as set forth in claim 18 wherein the four-bar linkage structure comprises a pair of parallel links offset one above the other, and means pivotally connecting one end of the links to the frame for rocking about vertically and horizontally offset pivotal axes for causing the links to contact when rocked to the horizontal position.

20. The invention as set forth in claim 19 wherein the four-bar linkage structure comprises first and second transversely spaced four-bar linkages, and wherein the platform is connected between links of the two linkages.

21. The invention as set forth in claim 20 wherein the platform is connected to the lower links of the spaced linkages.

* * * * *